3,009,970
PROCESS FOR PREPARING DIARYLS
Raymond C. Odioso, Glenshaw, Pa., and Kenneth J. Frech, Kent, Ohio, assignors to Gulf Research & Development Company, Pittsburgh, Pa., a corporation of Delaware
No Drawing. Filed Dec. 17, 1958, Ser. No. 780,932
16 Claims. (Cl. 260—670)

This invention relates to a process for the synthesis of aromatic compounds consisting of at least two distinct ring systems wherein the ring systems [whether single or polynuclear (condensed or uncondensed)] are connected to one another, preferably via a substituent group, and more particularly to the synthesis of bibenzyl.

The starting material which can be employed in the synthesis of the aromatic compounds described above are substituted aromatic compounds selected from the group consisting of alkyl or substituted alkyl aromatics and amine or substituted amine aromatics and are characterized in general by the following structural relationship:

XY wherein X can be an aromatic radical of phenyl, pyridyl, indenyl, pyrryl, furanyl, pyrazyl, thiophenyl, benzofuranyl, thionaphthenyl, decalyl etc.; and Y can be an alkyl radical having for example, from one to 16 carbon atoms, such as methyl, ethyl, isopropyl, normal butyl, isobutyl, normal pentyl, isopentyl normal hexyl, isohexyl, dodecyl, cetyl, etc.; $NH_2$; —NHR, wherein R can be

X as defined above, or substituted derivatives thereof, or an alkyl radical having from one to 16 carbon atoms, such as methyl, ethyl, isobutyl, hexyl, cetyl, etc.;

wherein R and $R_1$ can be the same or different, but similar to R immediately above. Similarly Y can be $CH_2A$, where A can be $NO_2$,

—CHO, phenyl, a substituted phenyl, etc. The substituent Y can be located on any available position on the aromatic ring. Examples of compounds which can be used include toluene, o,m,p-xylene, mesitylene, durene, isodurene, hexamethylbenzene aniline methylaniline, acetanilide, indene, methylthiophene, quinaldine, methylpyrazine, methylfuran, methylpyrolle, methylpyridine, α and β methylnaphthalene, methylbenzofuran, methylthianaphthene, methyldecahydronaphthalene, etc.

In order to prepare the compounds of this invention in the desired amounts it is absolutely necessary and critical that the starting material defined above be treated in admixture with an initiator and a promoter. Particularly suitable as initiators in the present process are compounds, hydrocarbons or otherwise, which, thermally, photolytically, by electron and X-ray radiation, or any other suitable means, will dissociate to yield free radicals. By "free radicals" we intend to include compounds which contain an odd number of electrons and are paramagnetic by virtue of the magnetically non-compensated electron. The presence of free radicals can be detected by magnetic susceptibility measurements, by nuclear magnetic resonance, by the fact that solutions containing free radicals do not obey Beer's law, by the usual colors associated therewith and by reaction of the radicals with free metals. Examples of free radical sources which are well known are peroxides, hydroperoxides, arylhydrazines, triazines, tetrazenes, diarylamines, triarylhydrazyls, diarylnitrogen oxides, arylthiyls, semiquinones etc. Representative compounds which can be employed are di-tertiary butyl peroxide, dibenzoyl peroxide, tetraphenylhydrazine, triphenylhydrazine, N-diphenylhydroxylamine, tetraphenyldibenzyltetrazane, diphenyldisulfide, duroquinone, 1-phenyl-3,3-dimethyltriazene, N-nitrosoacetanilide, etc.

Although the amount of charge or starting material employed relative to the initiator is not critical and can be as low as about one to about five moles and as high as about 25 to about one mole, we prefer to employ at least about two to about one mole but no more than about 15 to about one mole of starting material to initiator. Why this is so can be illustrated in the case wherein the starting material is toluene and the initiator is di-tertiary butyl peroxide. It is believed that the latter upon the application of heat ruptures at the oxygen-to-oxygen bond to form two moles of the tertiary butoxy radical, which, in turn, further decomposes to form two moles of acetone and two methyl radicals. The latter then can extract a hydrogen atom from the methyl substituent on the toluene to form a benzyl radical and methane. Since two methyl radicals are thus obtained from each mole of di-tertiary butyl peroxide, it is apparent that each mole of the initiator can extract a hydrogen atom from two moles of toluene. The benzyl radicals then combine to form one mole of bibenzyl. In the event a portion of the initial radicals from the di-tertiary butyl peroxide generate benzyl free radicals directly, the reason for having present at least about two moles of starting material per mole of initiator still holds. Thus the two moles of tertiary butoxy radicals initially formed from one mole of di-tertiary butyl peroxide can extract directly from two moles of toluene a hydrogen atom from each of the methyl substituents on the respective toluene molecules.

Promoters which are used in the process of the present invention must be compounds of carbon and hydrogen wherein all bonds are saturated, for example paraffinic compounds having a total of from 4 to 16 carbon atoms in the molecule, particularly isoparaffins having a total of from 4 to 16 carbon atoms in the molecule. Examples of promoters which can be used are isobutane, isopentane, normal hexane, isohexane, normal heptane, decane, cetane, etc. While we do not understand in what manner the promoter employed enters into the reaction, we do know that the amount of aromatic compound obtained is more than that which could be predicted from the ordinary course of reaction and far more than that which is actually obtained using substances which are not embraced by the above definition of promoters. The amount of promoter required is dependent upon the initiator, the temperature and the contact time employed and should be sufficient in amount to insure the reaction of the initiator radicals with the hydrocarbon charge. Thus, at least, about one, preferably about two to about four moles, of promoter, per mole of hydrocarbon charge is sufficient.

The temperature required in the present process must be at least sufficient to decompose the initiator in the manner set forth in detail above. Thus a temperature of at least about 60° F., preferably 300° to about 400° F., is sufficient for the stated purpose. While the pressure is not critical it should be at least sufficient to maintain the reactants in the liquid state at the temperature of reaction. Accordingly, a pressure of at least about 300, preferably about 500 to about 1000 pounds per square inch gauge is satisfactory.

The contact or reaction time is not critical and is a function of the reaction temperature. Thus it must be sufficiently long to permit at least the major part of the initiator to decompose, since the recombination of hydrocarbon radicals to form the desired aromatic compounds is more rapid than the rate of decomposition of the initiator. A contact time of at least about 4, preferably about 5 to about 10 hours, is sufficient.

The present process can be illustrated by the following. Example I below was operated in accordance with our invention.

*Example I*

Into a one-liter bomb were placed two moles of toluene, 0.143 mole of di-tertiary butyl peroxide as initiator and 4.15 moles of isobutane as promoter. The mixture was heated over a period of 6½ hours at a temperature of 500° F. while maintaining thereon a pressure of 1145 pounds per square inch gauge. At the end of the reaction period the gaseous contents of the bomb were vented through a wet-ice trap into a gasholder. The liquid product was removed and weighed. The products obtained were analyzed by mass spectrometric and infrared procedures. If desired, the liquid products of reaction can be treated by fractional distillation, and the bibenzyl is easily separated from the toluene, isobutane and ditertiary butyl peroxide, since the boiling point of bibenzyl is 284° C. at 760 mm. pressure in order to recover the desired aromatic compound. 0.171 mole of compound, in this instance bibenzyl, was obtained. In addition, there were found 0.004 mole of xylenes, 1.450 moles of toluene, 0.175 mole of methane and 3.310 moles of isobutane.

The advantage of operating in accordance with our process is apparent from an examination of Example I. As noted earlier, it would be expected that with each mole of initiator one mole of aromatic compound would be obtained. In this case, therefore, with 0.143 mole of di-tertiary butyl peroxide it would be expected that at best 0.143 mole of bibenzyl would be obtained. Instead 0.171 mole of bibenzyl was obtained, which is 18 percent greater than expected.

That the promoter must be selected with care and is critical in the process of this invention is apparent from Example II below.

*Example II*

The run of Example I was repeated using 0.205 mole of di-tertiary butyl peroxide, two moles of toluene and 4.30 moles of isobutene in place of isobutane as promoter. The temperature was maintained at 400° F., the pressure 825 pounds per square inch gauge and the reaction time 6 hours. Only 0.094 mole of bibenzyl was found, in addition to 0.036 mole of xylenes, 1.710 moles of toluene, 0.142 mole of methane, and 2.850 moles of isobutene. Since 0.205 mole of di-tertiary butyl peroxide was employed and only 0.094 mole of bibenzyl was obtained, it can be seen that only 45.8 percent of the expected bibenzyl was obtained. This should be contrasted with the result in Example I wherein substantially more than expected of bibenzyl was obtained.

While we have shown above the formation of bibenzyl using toluene as starting material, di-tertiary butyl peroxide as initiator and isobutane as promoter, we can substitute other compounds defined herein above for the starting material, initiator and promotor, respectively, to obtain the desired aromatic compounds. Examples of compounds which can be so obtained are bibenzyl, 1,2-ditolylethane, 1,2 - dixylylethane, 1,2 - dimesitylethane, 1,1,2,2 - tetramethyl-1,2-diphenyl - ethane, hydrazobenzene, 4,4' - diethylbibenzyl, 1,2-dithiophenylethane, 1,2-dipyridylethane, 1,2 - difuranylethane, 1,2-dinaphthylethane, 1,2-dipyrazylethane, hydrazotoluenes, etc.

The aromatic compounds obtained in this process can be used as heat exchange media, lubricating oils, chemical intermediates, etc. Bibenzyl, for example, can be treated in accordance with the process disclosed and claimed in our copending application Serial No. 780,949, filed concurrently herewith to obtain styrene and benzene.

Obviously, many modifications and variations of the invention, as hereinabove set forth, can be made without departing from the spirit and scope thereof, and therefore only such limitations should be imposed as are indicated in the appended claims.

We claim:

1. A process for producing aromatic compounds which comprises heating a substituted aromatic compound selected from the group consisting of alkyl aromatics and amine aromatics in the presence of a compound capable of producing a free radical and a paraffinic compound composed solely of hydrogen and carbon wherein all bonds are saturated, at a temperature of at least about 60° F. and a pressure capable of maintaining the reactants in liquid phase, said temperature being sufficient to obtain said free radical but insufficient to adversely affect the remaining compounds in the reaction zone.

2. A process for producing aromatic compounds which comprises heating an alkyl aromatic in the presence of a compound capable of producing a free radical and a paraffinic compound composed solely of hydrogen and carbon wherein all bonds are saturated, at a temperature of at least about 60° F. and a pressure capable of maintaining the reactants in liquid phase, said temperature being sufficient to obtain said free radical but insufficient to adversely affect the remaining compounds in the reaction zone.

3. A process for producing aromatic compounds which comprises heating an amine aromatic in the presence of a compound capable of producing a free radical and a paraffinic compound composed solely of hydrogen and carbon wherein all bonds are saturated, at a temperature of at least about 60° F. and a pressure capable of maintaining the reactants in liquid phase, said temperature being sufficient to obtain said free radical but insufficient to adversely affect the remaining compounds in the reaction zone.

4. A process for producing aromatic compounds which comprises heating toluene in the presence of a compound capable of producing a free radical and a paraffinic compound composed solely of hydrogen and carbon wherein all bonds are saturated, at a temperature of at least about 60° F. and a pressure capable of maintaining the reactants in liquid phase, said temperature being sufficient to obtain said free radical but insufficient to adversely affect the remaining compounds in the reaction zone.

5. A process for producing aromatic compounds which comprises heating toluene in the presence of a peroxide and a paraffinic compound composed solely of hydrogen and carbon wherein all bonds are saturated, at a temperature of at least about 60° F. and a pressure capable of maintaining the reactants in liquid phase, said temperature being sufficient to decompose said peroxide but insufficient to adversely affect the remaining compounds in the reaction zone.

6. A process for producing aromatic compounds which comprises heating toluene in the presence of a peroxide and a paraffinic compound having from 4 to 16 carbon atoms in the molecule at a temperature of at least about 60° F. and a pressure capable of maintaining the reactants in liquid phase, said temperature being sufficient to decompose said peroxide but insufficient to adversely affect the remaining compounds in the reaction zone.

7. A process for producing aromatic compounds which comprises heating toluene in the presence of a peroxide and an isoparaffin having from 4 to 16 carbon atoms in the molecule at a temperature of at least about 60° F. and a pressure capable of maintaining the reactants in liquid phase, said temperature being sufficient to decompose said peroxide but insufficient to adversely affect the remaining compounds in the reaction zone.

8. A process for producing dinuclear aromatic compounds which comprises heating toluene in the presence of di-tertiary butyl peroxide and isobutane at a temperature of at least about 60° F. and a pressure capable of maintaining the reactants in liquid phase, said temperature being sufficient to decompose said peroxide but insufficient to adversely affect the remaining compounds in the reaction zone.

9. A process for producing aromatic compounds which comprises heating a substituted aromatic compound selected from the group consisting of alkyl aromatics and amine aromatics in the presence of a compound capable of producing a free radical and a paraffinic hydrocarbon having from 4 to 16 carbon atoms in the molecule at a temperature of about 60° to about 400° F. and a pressure capable of maintaining the reactants in liquid phase.

10. A process for producing aromatic compounds which comprises heating an alkyl aromatic in the presence of a compound capable of producing a free radical and a paraffinic hydrocarbon having from 4 to 16 carbon atoms in the molecule at a temperature of about 60° to about 400° F. and a pressure capable of maintaining the reactants in liquid phase.

11. A process for producing aromatic compounds which comprises heating an amine aromatic in the presence of a compound capable of producing a free radical and a paraffinic hydrocarbon having from 4 to 16 carbon atoms in the molecule at a temperature of about 60° to about 400° F. and a pressure capable of maintaining the reactants in liquid phase.

12. A process for producing aromatic compounds which comprises heating toluene in the presence of a compound capable of producing a free radical and a paraffinic hydrocarbon having from 4 to 16 carbon atoms in the molecule at a temperature of about 60° to about 400° F. and a pressure capable of maintaining the reactants in liquid phase.

13. A process for producing aromatic compounds which comprises heating toluene in the presence of a peroxide and a paraffinic compound having from 4 to 16 carbon atoms in the molecule at a temperature of about 60° to about 400° F. and a pressure capable of maintaining the reactants in liquid phase.

14. A process for producing aromatic compounds which comprises heating toluene in the presence of a peroxide and a paraffinic compound having from 4 to 16 carbon atoms in the molecule at a temperature of about 60° to about 400° F. and a pressure capable of maintaining the reactants in liquid phase.

15. A process for producing aromatic compounds which comprises heating toluene in the presence of a peroxide and an isoparaffin having from 4 to 16 carbon atoms in the molecule at a temperature of about 60° to about 400° F. and a pressure capable of maintaining the reactants in liquid phase.

16. A process for producing dinuclear aromatic compounds which comprises heating toluene in the presence of di-tertiary butyl peroxide and isobutane at a temperature of about 60° to about 400° F. and a pressure capable of maintaining the reactants in liquid phase.

References Cited in the file of this patent

UNITED STATES PATENTS

| | | |
|---|---|---|
| 2,450,099 | Thompson | Sept. 28, 1948 |
| 2,524,318 | Kharasch | Oct. 3, 1950 |
| 2,792,430 | Porter et al. | May 14, 1957 |
| 2,818,441 | Vaughn et al. | Dec. 31, 1959 |